United States Patent [19]

Sikorski

[11] Patent Number: 4,521,316

[45] Date of Patent: Jun. 4, 1985

[54] OIL WELL COMPLETION FLUID

[75] Inventor: Charles F. Sikorski, Plainsboro, N.J.

[73] Assignee: FMC Corporation, Philadelphia, Pa.

[21] Appl. No.: 474,405

[22] Filed: Mar. 11, 1983

[51] Int. Cl.$^3$ .................. E21B 43/00; E21B 43/26
[52] U.S. Cl. .......................... 252/8.55 R; 252/8.55 E
[58] Field of Search ............ 252/8.55 R, 8.5 A, 8.5 B, 252/8.55 E, 387, 389.2; 422/18

[56] References Cited

U.S. PATENT DOCUMENTS

| | | | |
|---|---|---|---|
| 1,997,256 | 8/1932 | Hall | 422/18 |
| 2,280,997 | 4/1942 | Booth | 252/8.5 |
| 2,294,877 | 9/1942 | Wayne | 252/8.5 |
| 2,335,146 | 11/1943 | Ford et al. | 252/8.5 |
| 2,592,511 | 4/1952 | Chittum | 252/8.55 |
| 2,777,818 | 1/1957 | Gambill | 252/8.55 |
| 2,805,722 | 9/1957 | Morgan et al. | 166/35 |
| 2,898,294 | 8/1959 | Priest et al. | 252/8.55 |
| 3,014,863 | 12/1961 | Priest | 252/8.55 |
| 3,070,545 | 12/1962 | Thompson et al. | 252/8.55 |
| 3,246,692 | 4/1966 | Metler et al. | 166/1 |
| 3,481,869 | 12/1969 | Jones | 210/58 |
| 3,668,132 | 6/1972 | Finder | 422/18 |
| 3,670,820 | 6/1972 | Norton et al. | 166/305 R |
| 3,961,639 | 6/1976 | Chang et al. | 137/13 |
| 4,000,076 | 12/1976 | Bodine et al. | 252/8.5 B |
| 4,202,796 | 5/1980 | Jacob et al. | 252/389 A |
| 4,436,628 | 3/1984 | Ralston et al. | 252/389.2 X |

FOREIGN PATENT DOCUMENTS 520245 11/1951 Canada ........................... 252/8.55 R

*Primary Examiner*—Ben R. Padgett
*Assistant Examiner*—Virginia B. Caress
*Attorney, Agent, or Firm*—Frank Ianno; Eugene G. Seems

[57] ABSTRACT

A well-treating fluid of high density, solids-free and corrosion-resistance is formed comprising an aqueous solution of at least 50% by weight tetrapotassium pyrophosphate and a salt which can be either monopotassium orthophosphate, dipotassium orthophosphate or tripotassium orthophosphate, or mixtures thereof, wherein the salt is present in amounts sufficient to yield a predetermined pH in said fluid of about 8.5 to about 12, a predetermined specific gravity of at least about 1.65, and has high resistance to recrystallization of its solutes.

6 Claims, No Drawings

OIL WELL COMPLETION FLUID

The present invention is concerned with a well-treating fluid of high density which can be used following drilling to complete a well. Specifically, the present high density solids-free fluid is useful as a fracturing fluid, packer fluid or completion fluid where good stability, low corrosion and high resistance to recrystallization are desired.

In the present state of the art after an oil or gas well has been drilled, the casing is perforated to provide access through the casing to the earth formation containing the hydrocarbons to be recovered. This can be done by exploding shaped charges of various types in the casing or by mechanical punch-type casing perforators. In any event, upon perforating the casing, the interior of the well is subjected to the earth formation pressure and requires a counter balanced hydrostatic pressure of fluid in the well to prevent loss of control of the well. In practice, the hydrostatic pressure in the well is usually maintained somewhat higher than that of the earth formation, and some of the fluid in the well often flows through the perforation into the earth formation.

In such instance, it is undesirable to employ drilling muds as the well fluid. The muds, with their solid constituents, tend to plug perforations and if they enter the earth formation, they can interfere with the proper recovery of the desired hydrocarbon from its formation, particularly in sandy formations. Any drying of the muds, because of the heat and/or pressure reached in the base of the well further aggravates the plugging problem of such muds. In order to avoid such problems, it is common to use a solids-free completion fluid which is maintained in the well to balance the pressure exerted by the earth formation.

Another use for such a completion type fluid, often termed "packer fluid," is to exert a hydrostatic head on an annular packer to assure that the mined fluid or gas only issues from the tubing in the well under the control of the well operator. In practice, the packer is placed in the annular space between the casing and tubing, fluid tight, so that the formation products such as gas or oil, are sealed from escaping from the well except through the tubing. This annular space above the packer is then filled with a packer fluid to maintain a hydrostatic pressure on the up-bore or top side of the packer which is about the same, or perhaps slightly greater, than the pressure of the producing formation. By employing such a fluid, the formation products produce the same, or slightly less, pressure on the other side or down-bore side of the packer as the added fluid does on the opposite side of the packer. Thus, the removal of any substantial differential pressure across the packer minimizes any tendency for the formation products to bleed or leak around the packer.

In order for such completion fluids to be useful in these and other such completion applications, the fluid must have a sufficient specific gravity to exert the required hydrostatic pressure, and desirably, its density should be capable of being varied to exert the desired amount of hydrostatic pressure to balance the pressure exerted by the earth formation. The hydrostatic pressure of the completion fluid is based upon the height of the column of fluid in the well and its specific gravity. Since the well depth, and consequently the height of the column of fluid in the well is fixed, the only remaining variable, namely, the specific gravity of the fluid, should be capable of being varied to meet the needs of the hydrostatic pressure required downhole.

Another property desired of such completion fluids, is that they be noncorrosive to the ferrous metal tubing and pipes which they contact for prolonged periods. As can be readily realized, once a producing well is established and pipe, packing and completion fluid have been installed, replacement of any part of the pipe string, because of corrosion of the completion fluid, amounts to a major undertaking, requiring shut down of the well and a costly and extended period for removal and replacement of the pipe string. In addition, if the corrosion is severe and rapid, loss of control of the well due to pipe rupture is a serious possibility.

It has now been found that a dense, well-treating fluid that has a specific gravity of at least about 1.65, and which is corrosion-resistant and solids-free, is obtained in a composition comprising an aqueous solution of at least about 50% by weight of tetrapotassium pyrophosphate and a salt selected from the group consisting of monopotassium orthophosphate, dipotassium orthophosphate and tripotassium orthophosphate, said salt being present in amounts sufficient to yield a predetermined pH in said fluid of from about 8.5 to about 12 and a predetermined specific gravity of at least about 1.65, said fluid having high resistance to recrystallization of the solutes dissolved therein.

The well-treating fluids of the present invention can be made up by simply dissolving the required amount, from about 50 to about 64.5 weight percent, of dry potassium pyrophosphate in water with stirring until it has all been dissolved. Thereafter, the appropriate dry potassium orthophosphate is added to the water solution until it too is dissolved. The choice of potassium orthophosphate salt to be mixed with the tetrapotassium pyrophosphate depends upon the specific gravity of the final well-treating fluid that is desired. In general, at the same level of tetrapotassium pyrophosphate and the same weight level of orthophosphate salt, the monopotassium orthophosphate salt, when added, gives the lowest specific gravity, the dipotassium orthophosphate gives an intermediate specific gravity and the tetrapotassium orthophosphate gives the highest specific gravity in the final well-treating fluid.

An alternate method for making up these fluid compositions is to dissolve the tetrapotassium pyrophosphate in water until dissolved and thereafter add the potassium orthophosphate to the tetrapotassium pyrophosphate solution as an in situ mixture of phosphoric acid and potassium hydroxide. That is, instead of adding the potassium orthophosphate directly as its mono-, di- or tri- salt, an equivalent amount of phosphoric acid and potassium hydroxide are added corresponding to the desired potassium orthophosphate salt. The order of addition is not critical and can be varied to facilitate mixing. The amount of potassium orthophosphate added will vary depending on the specific gravity and the pH desired in the final fluid.

An advantageous property of the present well-treating fluid is its resistance to recrystallization or freezing under field use. In many cases, temperatures at the well head, that is at the earth surface, are such that many fluids in the prior art would be subject to freezing or recrystallization in well operations unless special precautions were taken. Since the freezing or recrystallization temperatures of such fluids may well be above the freezing temperature of water at zero degrees centigrade, and in some cases, maybe as high as 10° C. or 15° C., extensive precautions must normally be employed to prevent these fluids from freezing. These include the heating of storage and transport containers for these fluids and the maintenance of heating jackets around the well lines used to carry the fluid into and out of the well. Of course, such special handling involves considerable operating problems and expense to prevent such freezing or crystallization from occurring in such fluids.

The present well-treating fluids show no tendency for recrystallization of the solutes dissolved therein and thus can be handled where the well head temperature is at or somewhat below the freezing point of water, without having to employ special means for heating the fluid during storage or transportation of the fluid, or heating of the lines used to carry the fluid to and from the well head.

A further advantage of the present fluids comes from the high potassium content of the solutions to prevent the swelling of clay-containing formations into the well bore. This is due to the potassium ions low cation-exchange tendency with the sodium and calcium clays within such formations. In the past, potassium brines, such as potassium chloride solutions, were often added to well-treating fluids as an anti-swelling additive for the same purpose. In the present case, since the present well-treating fluid is made up entirely of different forms of potassium phosphates, the potassium value of the fluids is very high and achieves this anti-swelling function without the need to add such additives to the present fluid.

Another advantage of the present well-treating fluid is the diminished tendency towards corrosion of metal surfaces with which it is in contact, particularly the casing, tubing and other metal devices employed down hole in the well. It is known that phosphate solutions in general are helpful in preventing corrosion in water treatment and distribution systems. This phenomena is apparently based on a metal surface phosphatizing reaction in which the phosphate solutions react with the metal surface to form a barrier to corrosion on the surface of the metal in contact with the phosphate solution. This, of course, is quite important since replacement of any corroded pipe in a completed, producing well is both expensive and time consuming.

The following examples are given to illustrate the invention and are not deemed to be limiting thereof.

EXAMPLE I

A solution of tetrapotassium pyrophosphate (TKPP) was prepared using 437.5 grams of TKPP in 350 grams of water. The TKPP was added in successive quantities of approximately 50 grams to 1000 ml glass beaker containing the water stirred with a magnetic stir bar. After all of the TKPP had dissolved, monopotassium orthophosphate (MKP) was added to the solution in an amount corresponding to 10% by weight of the final solution. Stirring was continued until a clear solution was obtained. In this solution, the dissolved TKPP amounted to 50% by weight of the final solution. Two other solutions were then made up in similar manner as set forth above except that each of these solutions contained in place of MKP, the same weight, namely 87.5 grams of either dipotassium orthophosphate (DKP) or 87.5 grams of tripotassium orthophosphate (TKP). The resulting solutions were labeled as solutions a, b and c and contain the ingredients (in grams) as set forth below:

|  | a | b | c |
| --- | --- | --- | --- |
| TKPP | 437.5 | 437.5 | 437.5 |
| MKP | 87.5 | — | — |
| DKP | — | 87.5 | — |
| TKP | — | — | 87.5 |
| $H_2O$ | 350 | 350 | 350 |

The above solutions were then stored overnight and allowed to cool to room temperature. Thereafter, the specific gravity, pH, viscosity (using a Fann viscometer) and corrosion rate were determined. These are reported below:

|  | a | b | c |
| --- | --- | --- | --- |
| Specific Gravity | 1.690 | 1.715 | 1.720 |
| pH | 8.9 | 10.9 | 12.9 |
| Viscosity (CPS) | 34 | 39 | 38.5 |
| Corrosion Rate (mils/year) | 12.42 | 0.929 | 0.044 |

Samples of these well-treating fluids were then maintained at room temperature while other samples of the solutions were maintained at 3° C. After eleven months storage at room temperature, there was no sign of recrystallization or precipitation of any dissolved salts. In the case of the samples kept at 3° C., after one month storage there was no indication of recrystallization or solids in the fluids. The corrosion rate is well within the acceptable 10 to 20 mils/year permitted for such use.

EXAMPLE II

Solutions of well-treating fluids were prepared by the in situ production of the potassium orthophosphate salt using phosphoric acid and potassium hydroxide. In this case, each of the solutions labeled a, b and c were prepared by first mixing the potassium hydroxide (KOH) with water until dissolved, followed by the addition of the 85% phosphoric acid ($HP_3O_4$) and, finally, by the addition of the tetrapotassium pyrophosphate (TKPP). Each additive to the mixture was not added until the prior additive was completely dissolved in the solution. The compositions (in grams of ingredients) formed are set forth below as a, b and c and correspond to the addition of a monopotassium orthophosphate in composition a; a dipotassium orthophosphate in composition b; and the tripotassium orthophosphate in composition c.

|  | a | b | c |
| --- | --- | --- | --- |
| TKPP | 437.5 | 437.5 | 437.5 |
| $H_3PO_4$ | 74.2 | 57.9 | 47.5 |
| KOH | 36.1 | 56.1 | 69.3 |
| $H_2O$ | 327.3 | 323.2 | 320.7 |

The solutions were permitted to cool to room temperature and thereafter the specific gravity, pH and viscosity were taken in the same way as Example I and are reported below:

|  | a | b | c |
| --- | --- | --- | --- |
| Specific Gravity | 1.680 | 1.700 | 1.712 |
| pH | 8.67 | 9.83 | 12 |
| Viscosity (CPS) | 32.0 | 34.5 | 38.0 |

The resulting well-treating fluids were then stored at room temperature and at 3° C. in the same way as in Example I for the same amount of time. After examining these samples they were found to be completely clear without any sign of recrystallization or precipitation of any dissolved salts.

While the above exemplified solutions of well-treating fluids have been shown only with respect to the required ingredients, it should be understood that other additives normally used in well-treating of fluids, which are compatible with these formulations, can be used in the same manner as in the prior art. It is within the scope of the present invention to employ known additives for their usual functions in combination with the present well-treating fluids. These additives are well known to those skilled in the art and require no elaboration or specific enumeration to define their function and the proportions commonly used in such fluids.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood, that, within the scope of the appended claims, the invention may be practiced by those skilled in the art, and having the benefit of this disclosure, otherwise is specifically described and exemplified herein.

What is claim:

1. A high density, corrosion-resistant, solids-free, well-treating fluid consisting essentially of an aqueous solution of at least about 50% by weight tetrapotassium pyrophosphate and a salt selected from the group consisting of monopotassium orthophosphate, dipotassium orthophosphate and tripotassium orthophosphate, said salt being present in amounts sufficient to yield a predetermined pH in said fluid of from about 8.5 to about 12 and a predetermined specific gravity of at least about 1.65, said fluid having high resistance to recrystallization of the solutes dissolved therein.

2. The well-treating fluid of claim 1 containing about 50% by weight tetrapotassium pyrophosphate and about 10% by weight of monopotassium orthophosphate.

3. The well-treating fluid of claim 1 containing about 50% by weight tetrapotassium pyrophosphate and about 10% by weight of dipotassium orthophosphate.

4. The well-treating fluid of claim 1 containing about 50% by weight tetrapotassium pyrophosphate and about 10% by weight of tripotassium orthophosphate.

5. The well-treating fluid of claim 1 wherein its specific gravity is from about 1.65 to about 1.72.

6. The well-treating fluid of claim 1 wherein the tetrapotassium pyrophosphate is present from about 50 weight percent to about 64.5 weight percent.

* * * * *